No. 851,118. PATENTED APR. 23, 1907.
R. CHADWICK.
SUCKER ROD.
APPLICATION FILED JUNE 28, 1906.

Witnesses
J. A. Parrow
M. A. Schmidt

Roy Chadwick
By  Inventor
Milo B. Stevens & Co.
Attorneys

UNITED STATES PATENT OFFICE.

ROY CHADWICK, OF TIDIOUTE, PENNSYLVANIA.

SUCKER-ROD.

No. 851,118.  Specification of Letters Patent.  Patented April 23, 1907.

Application filed June 28, 1906. Serial No. 323,835.

*To all whom it may concern:*

Be it known that I, ROY CHADWICK, a citizen of the United States, residing at Tidioute, in the county of Warren and State of Pennsylvania, have invented new and useful Improvements in Sucker-Rods, of which the following is a specification.

This invention is a sucker-rod for oil-wells, and has for its object to provide a rod which can be made flexible to enable it to be wound on a drum.

The invention comprises a flexible cable on which a series of sleeves are strung which, when jammed tightly together, form a rod of sufficient stiffness so as not to buckle or bend when in use. Upon loosening the sleeves, the cable and sleeves can be wound on a drum, whereby the operation of removing the sucker-rod from the well is greatly facilitated.

Figure 1:
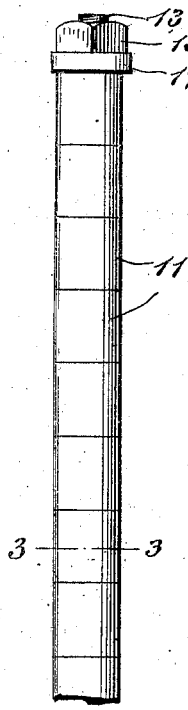
Figure 2:
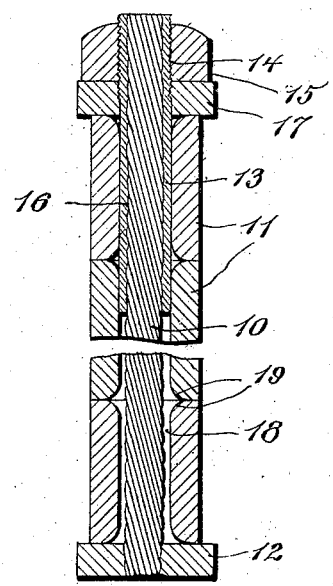
Figure 3:
Figure 4:
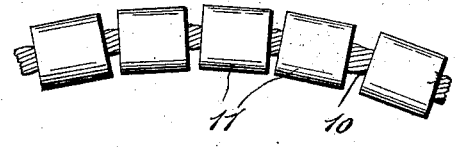

In the accompanying drawing: Figure 1 is an elevation of the invention; Fig. 2 is an enlarged longitudinal section; Fig. 3 is a horizontal section on the line 3–3 of Fig. 1; Fig. 4 is an elevation showing the sleeves loosened to render the rod flexible.

Referring specifically to the drawing, 10 denotes an ordinary flexible wire-cable, on which are strung a series of short sleeves 11. On the lower end of the cable is made fast a collar 12, and on the opposite end of the cable is made fast a stem 13 having threads 14 to receive a nut 15. The stem 13 has a bore 16 in which the cable is made fast in any suitable manner. A washer or collar 17 is placed between the nut 15 and the first one of the sleeves 11. The valve and operating means may be connected to the rod in any suitable manner.

The rod is made ready for use by jamming the sleeves 11 tightly together. This is done by screwing down the nut 15, the last sleeve being held by the collar 12. The rod then is sufficiently stiff to successfully resist all buckling or bending strain, and it can be used in the ordinary manner.

To remove the rod from the well, the nut 15 is unscrewed and a number of the sleeves 11 are removed from the cable so that the remainder will be sufficiently loose thereon to permit the cable to bend. The cable and the remaining sleeves thereon can then be wound on a drum. The bores 18 of the sleeves are large enough so that they will have free play on the cable, and they are also countersunk as at 19, so that they will slacken themselves when they are drawn over the drum.

The advantage of the construction herein described will be obvious. It saves time and labor, as one workman can readily remove the sucker-rod, whereas with the ordinary form of sucker-rod usually four attendants are required to remove it from the well.

I claim:

A sucker-rod comprising a flexible cable, a collar made fast to one end thereof, a threaded stem made fast to the other end of the cable, a nut screwed on the stem, and a series of sleeves on the cable between the collar and nut and adapted to be jammed together by the nut to make the cable rigid.

In testimony whereof I have signed my name to this specification in the presence of two subscribing witnesses.

ROY CHADWICK.

Witnesses:
JOHN DAY,
J. R. HOLDEN.